Figure 1:
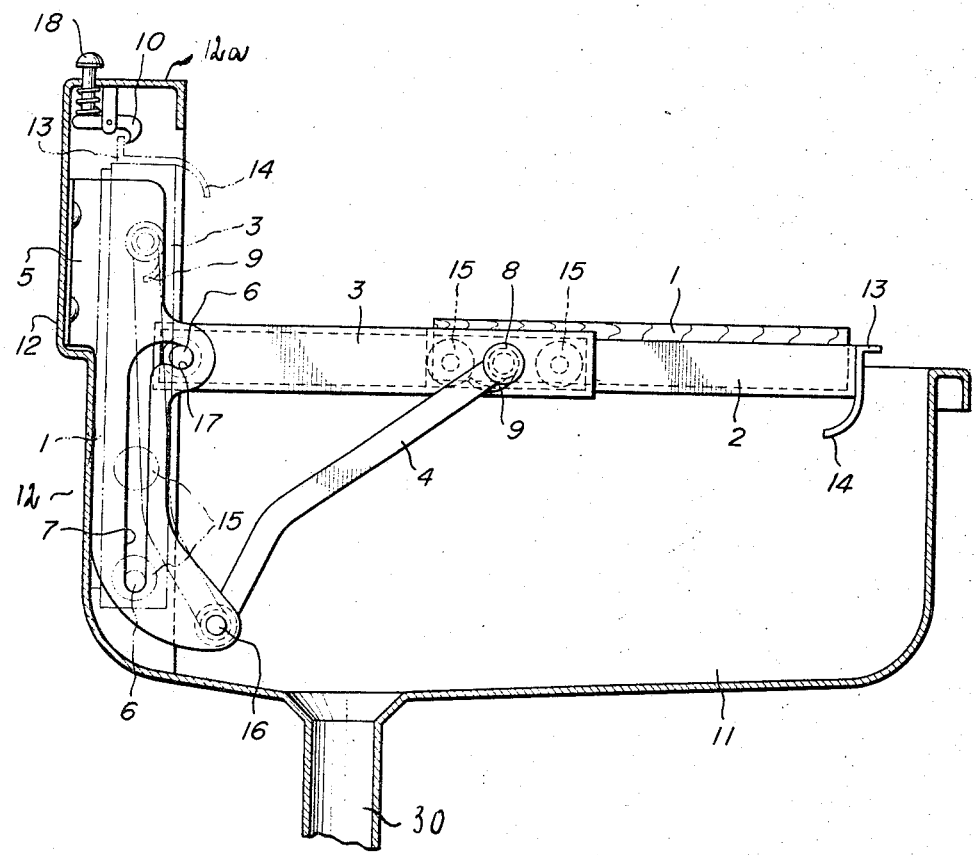

Oct. 17, 1967  KEIJI KASHIWAMURA  3,346,886
COMBINATION BASIN AND WORK BOARD
Filed Nov. 26, 1963  5 Sheets-Sheet 1

INVENTOR.
KEIJI KASHIWAMURA
BY
McGlew and Toren,
attorneys

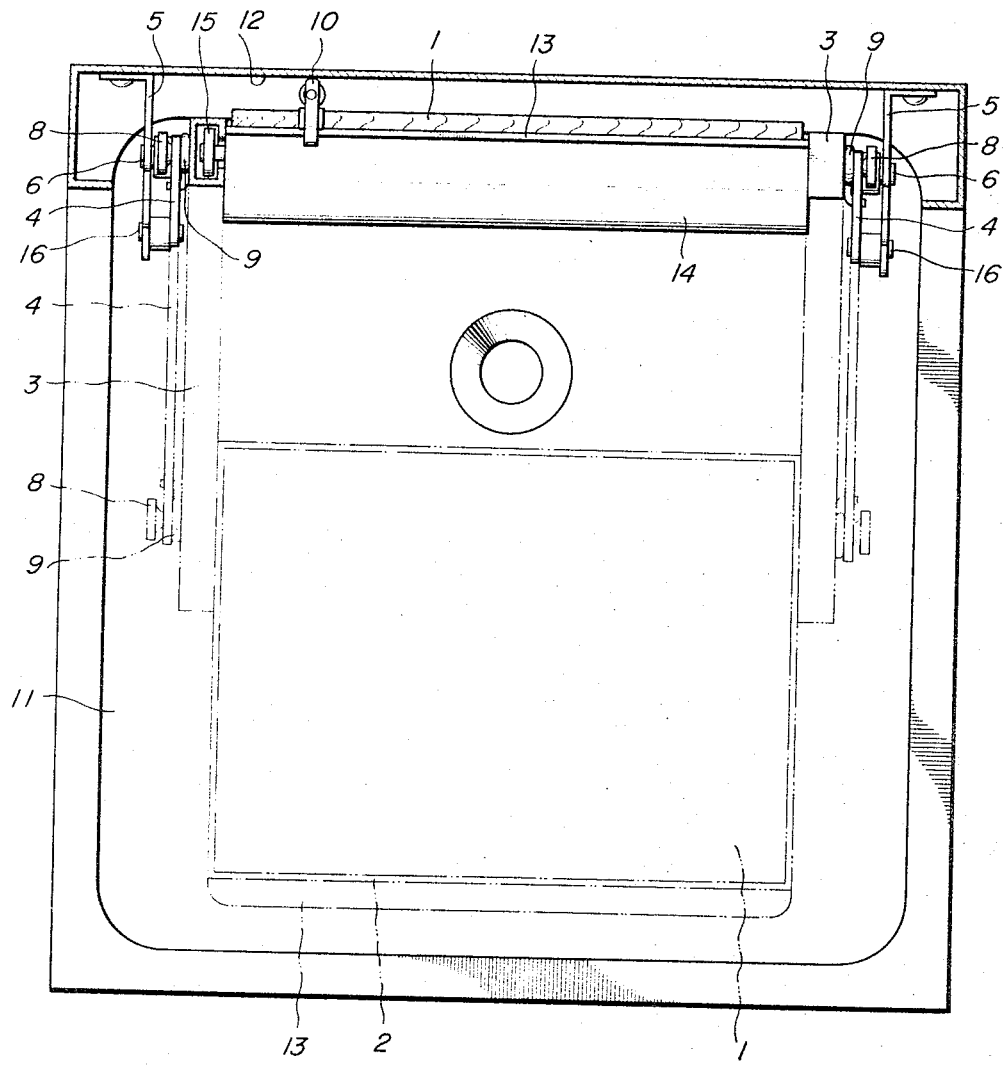

3,346,886
COMBINATION BASIN AND WORK BOARD
Keiji Kashiwamura, 301 Tenjin-cho, Kamimaruko, Kawasaki, Kanagawa Prefecture, Japan
Filed Nov. 26, 1963, Ser. No. 326,172
Claims priority, application Japan, May 1, 1963, 38/22,841
7 Claims. (Cl. 4—187)

This invention pertains, in general, to a combined basin, or sink, and work board, or shelf; and, in particular, to a new and improved arrangement of a basin and work board wherein the work board may be easily moved into said basin and away therefrom, and wherein the work board, when moved to a location in the basin, may be longitudinally positioned in the basin.

Particular utilizations of the combined basin and positionable work board provided by the present invention will vary widely. However, for illustrative purposes it is especially adapted for use in kitchens, both domestic and industrial, chemical laboratories, medical laboratories, etc. For example, when used in the kitchen it proves especially efficient in the cutting, or chopping, of meat, poultry, vegetables on the positionable board when arranged within a basin sink, tub or the like. Also, for example, in chemical laboratories it proves useful in that water neutralizable acids, or the like, may be safely transferred or otherwise used on the work board when positioned within the basin, or sink, which is filled with water to a level at, or near, said board. Also, for example, the present invention proves useful in medical or biological laboratories, wherein specimens placed on the board, or shelf, may be worked upon within the basin. In all of the aforementioned illustrative uses, the work board, or shelf, may after use be easily folded toward one wall of the basin, or sink, so as to be unobstructively out of the way to permit normal usage of the basin, or sink.

One object of the present invention is to provide a basin having combined therewith a work board, or shelf, which may be positioned within the basin or moved away therefrom; and, when the work board is in the basin it may be longitudinally positionable with respect thereto.

Another object of the present invention is to provide a new and improved combination basin and work board; the arrangement of which is relatively simple, reliable and economical.

According to an illustrative embodiment of the present invention there is provided a basin including means mounted on a back wall thereof adapted for receiving a supporting frame. A work board, or shelf, is suitably fitted with the supporting frame, the supporting frame including tray means for supporting the work board horizontally within the basin. The supporting frame is adapted for being rotated and translated such that it and the tray-held work board may be moved to the back wall of the basin when not in use. Also, associated with said supporting means are roller means for longitudinally positioning said tray and its supported work board when held horizontally in said sink.

According to one feature of the invention, there is provided a handle and latching means coupled with the tray such that the supporting means may, when said supporting means and tray-held work board is moved toward the back wall of the basin, be latched in an unobstructed position. The handle, hereinbefore mentioned, is adapted to be easily grasped by the hands of the user to move said supporting means and the work board.

Also, according to another feature of the invention, there is provided a spring loaded pushbutton mechanism which operates to latch and unlatch the supporting means into and to release it from its unobstructed position near the back wall of said basin.

Also, according to another feature of the invention, spring means are provided in association with said supporting means so as to automatically rotate and translate the supporting means and tray-held board to a horizontal position in the basin when they are unlatched from their vertical position against the basin's back wall.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 2:
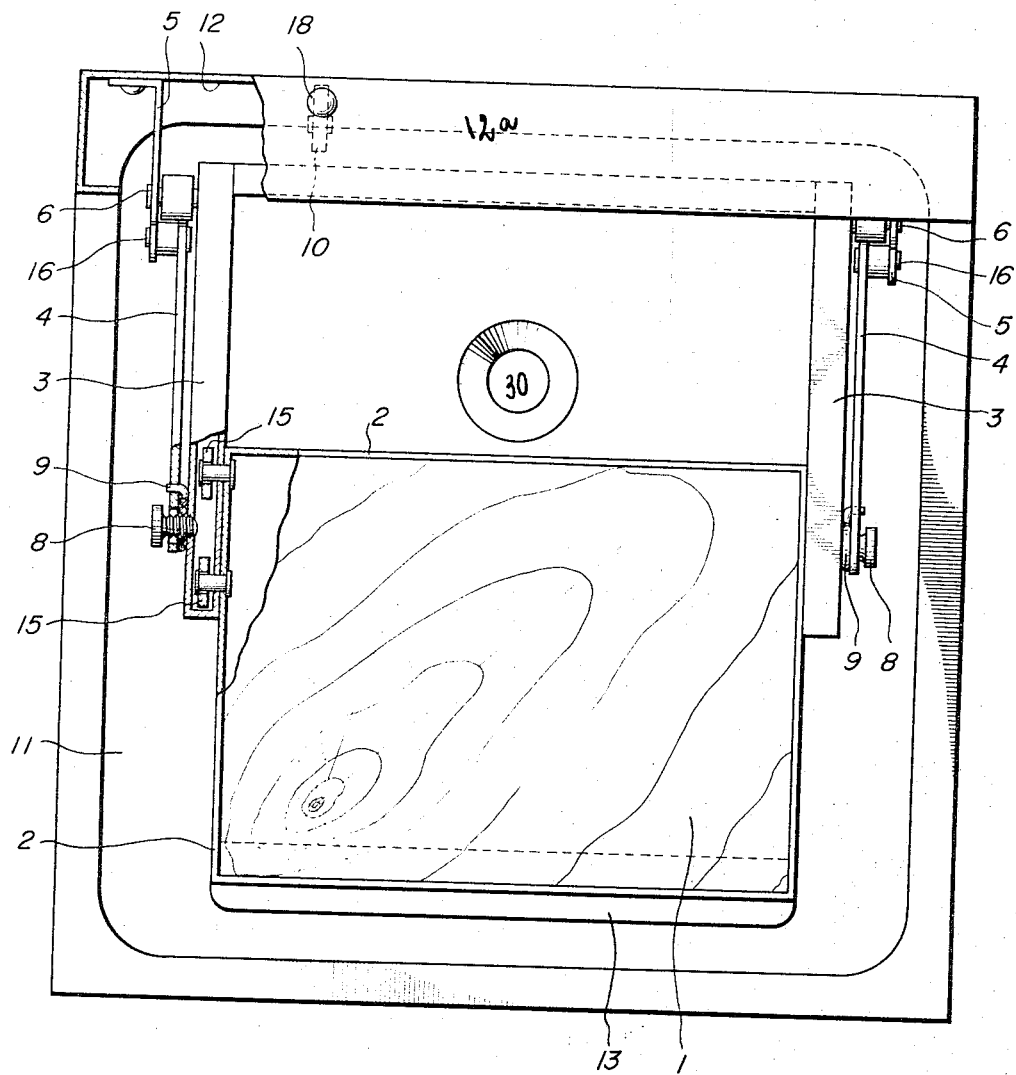
Figure 3:
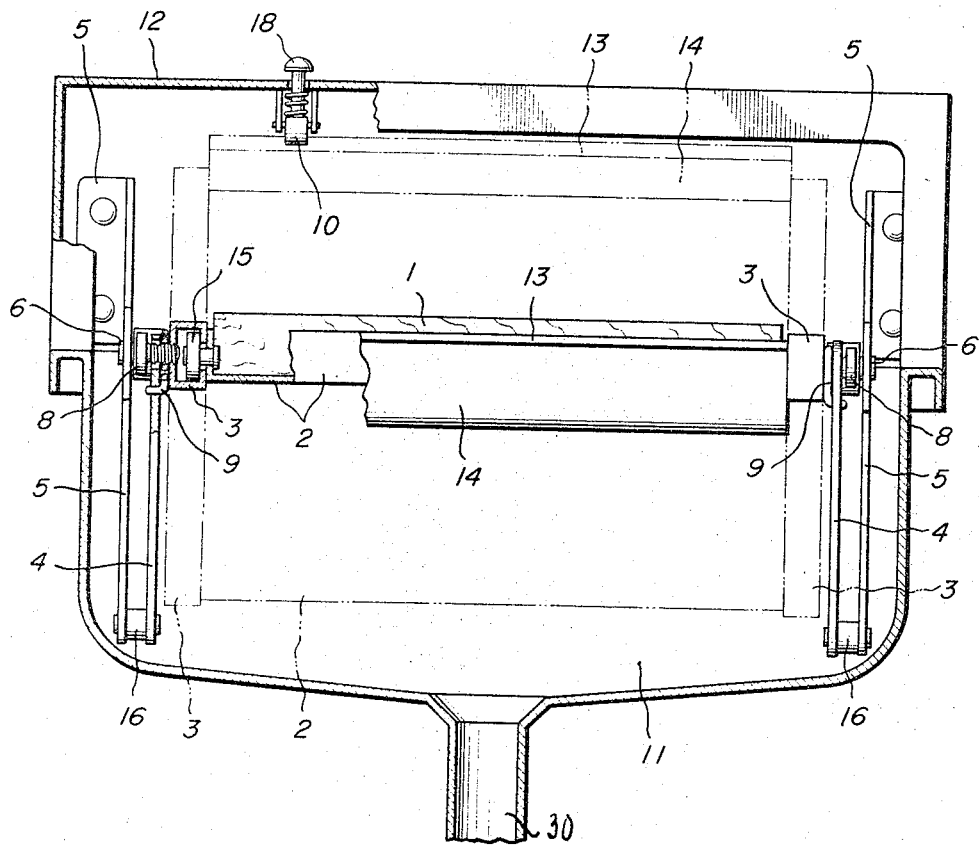
Figure 4:
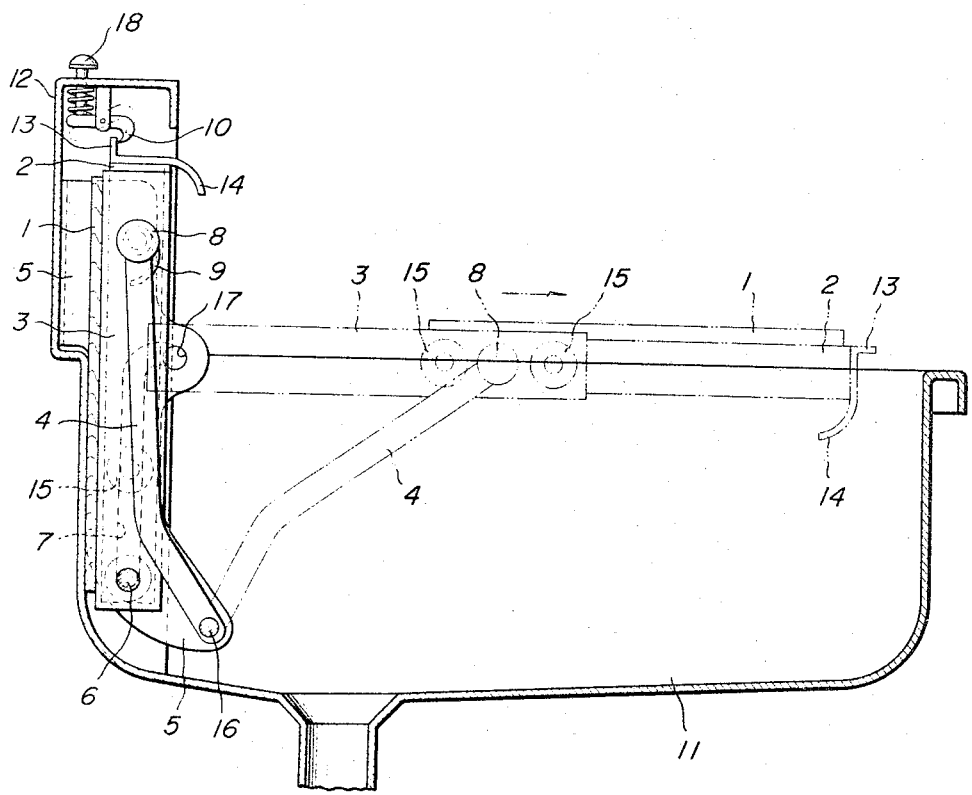

In the drawings:
FIG. 1 is an elevation view of the combined basin and work board according to the present invention, showing the basin in vertical cross section for purposes of clarity;
FIG. 2 is a plan view, partly sectioned, of the combined basin and work board of FIG. 1;
FIG. 3 is a front elevation view, partly sectioned, of the combined basin and work board according to the present invention;
FIG. 4 is an elevation view of the combined basin and work board according to the present invention, particularly illustrating the attitude of the work board and its support means when, unlike FIG. 1, it has been moved into its inoperative position at the back wall of the basin; and
FIG. 5 is a plan view of the combined basin and work board according to the invention as viewed from a vantage point above the apparatus of FIG. 4.

Referring now to FIGS. 1, 2 and 3, which respectively show the side elevation, the plan view and the front elevation of the subject invention, there is provided the conventional basin 11 including the back wall portion 12 and the drain 30. As indicated for illustrative purposes in FIG. 1, the back wall portion 12 is irregularly shaped; the back wall portion 12 being comprised of the two vertically offset wall portions 12, 12. Also, as shown at FIG. 2, there is formed integral with the back wall portions 12, the top ledge portion 12a extending inwardly toward the basin 11. Although it is not intended to be limited to such specific materials for the practice of the present invention, the basin, or sink, 11 may be formed from stainless steel, or the like. However, it is easily within the scope of the present invention that the basin, or sink, 11 be formed from any diverse materials such as porcelain, stoneware, fiberglass, etc. Also, the drain 30 may be formed from the same materials as the basin 11 or, optionally, and in accordance with the intended specific use, the dain 30 may be of material different from that of the basin 11. Although not shown in the drawing figures, the drain 30 may be mechanically coupled, or coupled by other equivalent means, with the basin 11 rather than be integrally formed therewith as indicated in the drawing figures.

As shown in the drawings, there is provided a work board, or shelf, 1. Depending upon the specific application involved, the work board 1 may serve as a support when horizontally disposed in respect to the basin 11, as shown in FIGS. 1, 2 and 3 for various materials. For example, the work board 1 may serve as a support for cutting, chopping, or otherwise processing meat, poultry or vegetables. With equal applicability, the work board 1 may serve as a work board, or shelf, for mixing various chemicals, such as acids, or the like. Or, with equal applicability, it may serve as a work board for examination, disection, etc. of various biological, or medical, specimens. Again, depending upon the particular application, the work board 1 may be comprised of wood, stoneware, synthetic material, metallic materials, or alloys thereof. Also, many other materials, depending upon the specific application, may be employed in fabricating the work board 1.

Supporting and holding the work board 1 is the generally rectangular frame 2. It is to be understood that although the drawings figures illustrate the frame 2 as being generally rectangular in shape, many other diverse shapes could be used. For example, the shape of the board 1 and the supporting frame 2 may be circular, elliptical, triangular, hexagonal, etc.

Moreover, it is to be understood that the surface of the work board 1 need not necessarily be flat. If desired, and according to the particular application involved, the surface of the work board 1 may contain various recesses, or pockets (not shown) for the retention of various elements, or tools, employed. For example, various parts of disected biological, or medical, specimens may be received in such pockets, or recesses.

Welded or otherwise suitably fastened to the front portion of the frame 2 is the member having the integral formed ledge 13 and the handle 14. The ledge 13, as indicated in FIG. 4, is adapted to be held by a latch 10 when the frame 2 and board 1 are folded toward the back wall portion 12 of the basin 11. The handle 14, provided for facilitating manual movement, curves inwardly under the frame 2, as shown in FIG. 1, when the board and frame 1 and 2, are in the horizontal working position within the basin.

As shown in FIGS. 2 and 3, two guide rail members, or tracks, 3 extend from near the back wall of the basin 11 parallelly toward the front of the basin and along a portion of the opposing side wall of the board-supporting frame 2. Near the back wall of the basin, these guide rails, or tracks, 3 are cross connected by a longitudinal member (see FIG. 2). As shown in FIG. 3, the cross section transversely through the guide rails, or tracks, 3 is generally rectangular. However, each side wall of the guide rails 3 which abuts against the side walls of the frame 2 has therein a slot which extends longitudinally along substantially the entire length of the guide rail members 3. As is shown in FIGS. 2 and 3, there is situated within the guide rails, or tracks 3 the two rollers 15 which are rotatively mounted on small stub shafts, or pivot pins, which have an opposing end thereof fastened to the side walls of the frame 2.

The board, or shelf, 1 supported in the tray, or frame 2 is shown in FIGS. 1 and 2 as being drawn out to the fullest extent permitted by the rolling movement of the rollers 15 in the guide rails 3. As may be appreciated from FIG. 2, the board and frame 1, 2 may, if desired, be moved from a position at the front of the basin toward the back thereof by rotation of the rollers 15 in the guide rails 3. This may be done by hand pushing the frame member 2. Fastened in a vertical attitude at the back of the basin 11 on the back wall portions 12 thereof are the two spaced-apart bracket 5. As shown in FIG. 1, each bracket 5 has formed therein the generally vertical slot 7. At the uppermost portion of the slot, it is curved in a direction about perpendicular to the long portion of the vertical slot and slightly downward with respect thereto as shown in FIG. 1. This uppermost curved portion of the slot 7 defines a receiving hole 17, which acts, as hereinafter explained, as a detention hole for a pin, or cam follower, 6.

As shown in FIG. 1, there are provided the lever arms 4 which extend from each of the brackets 5 to a side wall of the guide rails 3. As shown in FIGS. 1 and 3, the lever arm 4 has one end thereof pivoted to the lowermost portion of the bracket 5 by a pivot pin 16. Through a suitable aperture in the upper end of the lever arm 4, there is provided a screw 8 which is engaged in a suitably threaded aperture in a side wall of the guide rail, or track, 3. As indicated in FIGS. 2 and 3, a spiral spring 9 is concentrically arranged about the shaft of the screw 8 and is situated between a side wall of the guide rail 3 and the lever arm 4. One end of the spiral spring 9, as shown in the drawings, is fastened to the lever arm 4 by passing through a suitable aperture in the lever arm 4. The action of the spiral springs 9 is discussed hereinafter.

Extending from an end of each of the guide rails, or tracks, 3 is a pivot member, or cam follower, 6. This pivot member 6 is intended for sliding movement within the slot 7 and the detention hole portion 17 thereof.

As shown in FIG. 1, there is provided a spring loaded latch in the upper ledge portion 12a of the back wall 12 of the basin 11. Manual depression of the plunger 18 against the force of a coil spring disposed about the plunger's shaft pivots the latch 10, which so that, as suggested at FIG. 4, the latch 10 bears against the ledge 13 under spring bias, is released or disengaged to allow the board and frame assembly 1, 2 to be moved into its horizontal position within the basin 11.

Operationally, when the lever arms 4 are pivoted counterclockwise from the condition shown in FIG. 1 to the condition shown in FIG. 4, the spiral springs 9 become wound more tightly about the threaded shaft of the screw 8. As a result, the tightly wound spiral springs 9 exert a great force at the end of the lever arms 4 to tend to rotate the lever arms 4 in a clockwise direction when the frame 2, its supported board 1 and the guide rails 3 are in the condition shown at FIG. 4. However, the spring loaded latch 10 prevents this clockwise movement because it holds the ledge portion 13 securely. However, upon depression of the plunger 18, the spiral springs 9 exert a clockwise turning movement on the lever arms 4 which causes rotation of these lever arms. As the spring forced lever arms 4 start to rotate clockwise, the pivot pins 6 attached to the ends of the guide rail members 3 move upwardly in the slot 7, at the uppermost portion of which they enter the detention holes 17, thereby securely holding the guide rails 3, frame 2 and board 1 in the condition shown in FIG. 1. The rollers 15 roll in the guide rail members 3 so that the board and frame 1 and 2 can be positioned (as shown in FIG. 1) at their maximum extended position in the basin.

While a specific embodiment of the invention has been shown and described in detail to illustrate the application of the inventive principles, it will be understood that the invention may be embodied otherwise without departing from such principles.

What is claimed is:

1. In combination, a basin including a back wall protruding upwardly; a pair of spaced-apart brackets mounted on said basin's back wall, said brackets extending from within said basin and upwardly along said protruding back wall out of said basin, each said bracket having a long vertical slot therethrough extending from within said basin upwardly to a termination point approximately above said basin, the slot at said upward termination point defining a detention hole angularly offset from said vertical slot; a pair of longitudinal guide rail members, each guide rail member having a pin extending perpendicularly outward from an end thereof, the guide rail members' pins being received in said respective slots enabling said guide rail members to be slidable and rotatable by the sliding of said pins along said respective slots into or out of said detention holes; a work board; a frame supporting said work board; rollers fastened to opposing sides of said frame, said rollers being received by said guide rail members on opposing sides of said frame and enabling movement of said frame and its supported board in a longitudinal direction parallel to said guide rail members; a pair of rotatable lever arms, each said lever arm having an end thereof pivoted to a portion of a respective bracket below said slot therein and having the other end thereof pivoted near the end of a guide rail member opposite the end having said perpendicularly extending pin; a handle on said frame for facilitating manual rotative and sliding movement of said board-supporting frame and guide rail members from a horizontal position over the basin to a generally vertical position against the basin's back wall by allowing said rollers to roll along said guide rail members to slide the frame therealong and to cause said pin to move out of said detention hole and slide downwardly along said slot; a latch on the basin's back wall for holding the frame, board and guide rail members in said vertical position; and spring means urging said lever arms into rotative movement so that, upon release of the latch, said lever arms rotate in a direction into said basin thereby sliding the guide rail members' pins upwardly in said slots into the detention holes and rotate said guide rail members and frame-supported board into said horizontal position.

2. The combination, according to claim 1, wherein said spring means is comprised of two spiral springs, each spring being arranged with a respective lever arm, each spiral spring being wound about a pivot connecting one end of the respective lever arm with an end of a guide rail member, one end of each spring continuously urging the associated lever arm into rotative movement, said spiral springs becoming more tightly wound and exerting greater urging force on said lever arms as said guide rail members, frame and board are moved from said horizontal position to said vertical position.

3. A work board apparatus, adapted to be supported on a wall and be positioned horizontally and slidable with respect thereto when in use and be positioned vertically against the wall when not being used, comprising: bracket means mounted on the wall, said bracket means being formed with a vertical slot and a detention hole at the top of said slot; track means having a pin projecting transversely from an inner end thereof and arranged for sliding movement upwardly along said vertical slot and into said detention hole, whereby said track means is enabled to be moved rotatively and slidably; lever means pivotally connected at one end to a lowermost part of said bracket means and at the other end to the other end of the track means opposite the inner end thereof having said slidable pin, said lever means supporting said track means in a horizontal position when said projecting pin has been moved upwardly along said slot and into said detention hole and supporting said track means in a vertical position, with its inner end adjacent the lower end of said bracket means, when said projecting pin is moved downwardly in said slot to the lowermost part of said slot; and frame means supported by roller means in said track means to enable sliding movement of said frame means along said track means, said work board being supported in said frame means.

4. The apparatus, according to claim 3, further comprising latch means mounted on the wall and releasably engageable with said board-supporting frame means for latching the latter and said track means in said vertical position.

5. The apparatus, according to claim 4, further comprising spring means engaged between said lever means and said track means and biasing said lever means to rotate said track means and frame means and cause sliding movement of said track means' projecting pin upwardly along said slot and into said detention hole.

6. The apparatus, according to claim 5, further comprising ledge means on an end of said frame means adapted for engaging with said latch means to hold said board-supporting frame means and track means in said vertical position.

7. The combination, according to claim 1, wherein each guide rail member has a longitudinal hollow interior portion defined between side wall portions forming the rail member for receiving the rollers of said frame, one said side wall portion having a slot extending longitudinally along the rail member, each said roller being journalled for rotation on one end of a shaft, said shaft extending from said interior portion through said side wall portion's slot to said frame for connection thereto.

References Cited
UNITED STATES PATENTS

| | | | |
|---|---|---|---|
| 2,199,981 | 5/1940 | Bell | 108—134 |
| 2,594,938 | 4/1952 | Leavitt | 4—187 |
| 3,080,832 | 3/1963 | Schroemges | 108—134 |

FOREIGN PATENTS

| | | |
|---|---|---|
| 1,026,511 | 2/1953 | France. |
| 84,075 | 6/1954 | Norway. |

LAVERNE D. GEIGER, *Primary Examiner.*

H. K. ARTIS, *Assistant Examiner.*